Patented Mar. 2, 1948

2,437,174

UNITED STATES PATENT OFFICE 2,437,174

PRODUCTION OF ACTIVE CARBON

Frank Kerr Signaigo, Kenmore, N. Y., assignor to E. I. du Pont de Nemours & Company, Wilmington, Del., a corporation of Delaware No Drawing. Application June 2, 1945,
Serial No. 597,369

3 Claims. (Cl. 252—286)

This invention relates to a new form of active carbon and to a novel process for producing such product.

In producing active carbon from vegetable matter, the latter is usually heated to a moderately high temperature, either in the absence of air or in the presence of a limited amount of air to obtain the so-called primary char. Frequently the vegetable matter is first impregnated with inorganic substances such as zinc chloride or sulfuric or phosphoric acids to aid in the charring and to increase the porosity of the char. This primary char possesses little activity as an absorbent and a subsequent activation step is required, during which the primary char is further heated to a high temperature in the presence of an oxidizing agent such as air, steam, carbon dioxide or chlorine. While these processes have given very highly absorbent carbons and are very important industrially, their steps usually take many hours for completion, require considerable equipment, and involve a large percentage loss of the original material.

It is an object of the present invention to overcome these and other disadvantages in prior methods for producing active carbon, and to provide in particular a rapid, simple and direct process for obtaining such product. A further object is to provide an active carbon in a physical form that is especially suited for many absorption processes. Other objects and advantages of the invention will be evident from the following description.

The foregoing and other objects are accomplished in this invention which comprises impregnating a cellulosic material which is in a relatively thin or sheet form with boric acid or a boric acid-yielding substance, igniting the resulting impregnated cellulose material, allowing it to burn freely in an excess of air and thereafter extracting the residual boric acid or oxide with water from the resulting active carbon or carbonaceous ash.

In a more specific and preferred embodiment, the invention comprises impregnating a relatively thin, sheet form of cellulosic substance with a saturated, aqueous solution of boric acid, drying the impregnated material in an oxidizing atmosphere and then igniting the dried material in an excess of air to obtain the final, activated carbon product in the form of its original structure, i. e., a thin, fibrous, porous sheet.

To a clearer understanding of the invention the following specific examples thereof are given, which are merely illustrative and not to be construed as limiting the invention:

Example I

A cotton fabric is wet with a saturated aqueous solution of boric acid and then dried. The dried impregnated fabric is then hung in air, ignited and allowed to burn freely. The black ash remains in the form of the original fabric having in appearance a woven structure. While it is friable and readily rubbed or crushed to an exceedingly fine and suspensible powder yet it is strong enough that it can be handled and retain its fabric form. The boric acid is extracted by placing the carbonaceous ash in a bath of running water or in several changes of hot water. When substantially all of the boric oxide has been removed the carbon fabric is dried. The yield is 20% by weight based on the original cotton.

This product is highly absorbent when evaluated by a standard iodine test ("Active Carbon," John W. Hassler, page 91). Seventy-four percent of the iodine is absorbed. It has the high surface area of 530 sq. meters/g. as determined by the absorption of nitrogen at low temperature. Solutions of potassium permanganate and various dyestuffs are rapidly decolorized on passing through packs made up of layers of the fabric.

Example II

Bleached wood pulp sheets are wet with a hot 10% solution of boric acid by immersion in such solution and are then allowed to dry. The dried, impregnated pulp sheets are then hung in air, ignited and allowed to burn freely to produce a black ash material which is in the form of a felted sheet similar in shape to the original sheet. Residual boric acid and boric oxide is extracted from the carbonaceous sheet by leaching and through placing the same in a bath of running water, the extracting operation being continued until substantially all of the residual boron compounds have been removed, after which it is dried to produce the active carbon material in the form of a felted sheet which is very highly absorbent, as determined by the test referred to in Example I.

The active carbon obtained in accordance with the invention advantageously will have the same form as the starting material and can thus be readily obtained in the form of a recticulated structure or woven fabric, felted sheets or thin films. While above illustrated in respect to the treatment of particular cellulosic materials, other forms of cellulose such as cotton fibres, cotton linters, regenerated cellulose fibers and films, felted sheets, paper, thin wood veneers and various other vegetable materials in the form of thin flakes, husks and chips may be subjected to treatment and similarly converted to active carbon. Raw materials of high cellulose content are preferred. The form of the original material will determine largely the form of the active carbon but obviously any of these may be converted to powder form, if desired.

Boric acid comprises the preferred impregnating substance for use in the invention, but other water-soluble and organic solvent-soluble boron compounds which are sufficiently non-volatile and become converted to boric acid or oxide during the burning or ignition step may be employed. Among examples of such additional, useful boron compounds may be mentioned relatively non-volatile organic esters of boric acid, such as the boric acid esters of ethylene glycol, glycerol and sorbitol, and amine addition products of boron trichloride with amines such as trimethylamine, triethylamine, tributylamine and triethanolamine, etc.

The amount of boric acid or boron compound to be applied to the cellulose material prior to ignition may be varied and generally ranges from about 1–15%. If only 1–2% is applied, the yield will be somewhat low but a product of good activity will be obtained. At about 15% of boric acid a good yield of active carbon is obtained but the extraction of boron oxide will take longer than with smaller amount of the impregnant. Preferably an amount ranging from about 5–10% of boric acid is used to obtain optimum results. Obviously the residual boric acid or inorganic boron compound extracted from the active carbon by leaching can be used to impregnate more of the cellulose material so that only cellulose and air are used up in the process.

The process is admirably suited to a continuous operation in which the cellulose material is led consecutively through boric acid solution, a drier, a burning chamber, a leaching bath and a second drier. A very short time cycle can be achieved.

The active carbon so produced may be subjected to further activating treatments such as acid or alkali extraction, degassing or selective oxidation as with conventional carbons, but a special advantage of this invention is the high activity obtained by the initial simple operations.

The active carbon of this invention may be used for many commercial absorption processes such as the purification of water solutions, sugars, syrups, oils, chemicals and the like. In the form of porous fabric or felted sheets it is admirably suited for the purification of solutions and for absorbing gases or vapors by passing these through packs of the fabric or sheets, thus giving intimate contact with even flow free from clogging or channeling. This product is also well suited as a catalyst support and may be impregnated with various catalytic materials, being especially adapted for use in continuous type catalytic processes. For some purposes, it is desirable to sandwich the active carbon in the form of a fabric between two or more layers of glass, wool, regenerated cellulose or cotton fabrics, thereby adding physical support to the active carbon structure. For other purposes, the weakness or friability of the active carbon structure can be overcome by impregnating a flame-resistant, such as a glass or asbestos, structure with a viscose solution containing the boric acid or boric acid-yielding substance, regenerating the cellulose in situ on the flame-resistant structure and then igniting the regenerated cellulose.

I claim as my invention:

1. A method for producing highly-absorbent, active carbon in sheeted form comprising impregnating a sheeted, cellulosic material with a solution of a boron compound selected from the group consisting of boric acid and compounds which on ignition yield boric acid until 1–15% by weight of the boron compound is impregnated, igniting the material so impregnated and allowing the same to burn in an excess of air, and then water extracting residual boron compounds from the resulting active carbon product.

2. A method for producing highly-absorbent, active carbon in sheeted form which comprises impregnating a sheeted, cellulosic material with a saturated solution of boric acid until 1–15% by weight of the boron compound is impregnated, igniting the resulting impregnated material and allowing the same to burn freely in an excess of air, and thereafter extracting through leaching with water a residual boric acid from the active carbon material.

3. A method for producing highly-absorbent, active carbon in sheeted form which comprises impregnating a cotton fabric with a saturated aqueous solution of boric acid until 1–15% by weight of the boron compound is impregnated, drying the impregnated material and then igniting the same and allowing it to burn freely in an excess of air to produce a black ash in a form similar in structure to the original fabric, and then extracting by leaching with water residual boric acid present in said carbonized fabric and drying and recovering the final active carbon sheet.

FRANK KERR SIGNAIGO.

REFERENCES CITED

The following references are of record in the file of this patent:

UNITED STATES PATENTS

| Number | Name | Date |
|---|---|---|
| 537,555 | Stiens | Apr. 16, 1895 |
| 1,774,585 | Barnebey | Sept. 2, 1930 |
| 1,848,946 | Godel | Mar. 8, 1932 |
| 1,911,279 | Hochstetter | Mar. 30, 1933 |